United States Patent [19]
Adams et al.

[11] Patent Number: 5,151,854
[45] Date of Patent: Sep. 29, 1992

[54] INTEGRATED LOW VOLTAGE DETECT AND WATCHDOG CIRCUIT

[75] Inventors: John T. Adams, Minneapolis; Timothy M. Tinsley, Coon Rapids, both of Minn.

[73] Assignee: Honeywell Inc., Minneapolis, Minn.

[21] Appl. No.: 556,923

[22] Filed: Jul. 20, 1990

[51] Int. Cl.⁵ .................. G05B 23/02; G06F 11/30
[52] U.S. Cl. .................................. 364/184; 361/92; 371/66
[58] Field of Search ............... 364/184, 550; 110/191, 110/193; 307/130; 340/511, 513; 361/88, 92; 371/12, 14, 66; 431/24, 25, 26

[56] References Cited

U.S. PATENT DOCUMENTS

| | | | |
|---|---|---|---|
| 4,317,056 | 2/1982 | Alberts | 361/92 |
| 4,399,537 | 8/1983 | Jones | 371/14 |
| 4,410,991 | 10/1983 | Lenart | 371/66 |
| 4,439,805 | 3/1984 | Tarleton | 364/184 |
| 4,444,551 | 4/1984 | Mueller et al. | 431/25 |
| 4,446,499 | 5/1984 | Kishimoto et al. | 364/184 |
| 4,586,179 | 4/1986 | Sirazi et al. | 371/66 |
| 4,604,046 | 8/1986 | Meuller et al. | 431/2 |
| 4,644,266 | 2/1987 | Reuter | 324/73.1 |
| 5,047,987 | 9/1991 | Kosuge | 365/228 |

Primary Examiner—Jerry Smith
Assistant Examiner—Paul Gordon
Attorney, Agent, or Firm—Robert B. Leonard

[57] ABSTRACT

A low voltage monitor and microcontroller output monitoring circuit for insuring proper operation of a microcontroller in a furnace control system. A switch connected to a reset port of the microcontroller is capable of putting either a high or low voltage signal at the reset port. A high signal is required for normal operation of the microcontroller. The low voltage monitor connects to a power supply providing power to the microcontroller and causes the switch to provide a low signal to the reset port if the output voltage of the power supply drops below a predetermined level. The output monitoring circuit insures that the microcontroller is operating properly by insuring that the microcontroller is producing an output signal at a predetermined frequency and repetition rate. If the output signal is not at the predetermined frequency, the output monitoring circuit causes a low voltage to be present at the reset port.

14 Claims, 2 Drawing Sheets

INTEGRATED LOW VOLTAGE DETECT AND WATCHDOG CIRCUIT

BACKGROUND OF THE INVENTION

The present invention relates to the field of microcontroller and more specifically microcontrollers used in furnace control systems.

Microcontrollers were widely used in heating and cooling control systems. In a furnace system, a microcontroller was responsible for operating, for example, valves, fans and igniters. The microcontroller also received inputs such as signals from limit switches. Due to the explosive nature of the gas used in furnaces, proper operation of the microcontroller was vital to insure safe operation of the furnace. Usually, in order to perform these functions, the microcontroller system included Read Only Memory (ROM) and Random Access Memory (RAM).

The microcontroller typically operated according to the cycle indicated in FIG. 1. Once started at box A, the microcontroller went through an initialization process at box B. Interrupts were enabled at box C. Then, ROM was tested at box D.

After the ROM test, the microcontroller would go into an operational loop. At box E, inputs were received. At box F, control functions were performed. At box G, outputs from the microcontroller were checked. At box H, RAM was tested. Lastly, at box I, the timers were checked to insure a constant time base signal was being generated. Then, the cycle would start over again at box E. The microcontroller also included a reset function (not shown) which causes the microcontroller to re-initialize when a signal at the reset port drops below a threshold voltage.

It was important that the microcontroller operate correctly and produce the proper outputs to insure safe operation of the furnace. Microcontrollers required some source of power for operation. One problem which commonly caused improper operation of the microcontroller was a drop in the microcontroller's power supply.

Another problem in the operation of the microcontrollers is that occasionally, the microcontroller may stop inadvertently at one step of its cycle and fail to proceed any further. This in turn affects the frequency and the repetition rate of the output signal Thus it is an objective of the present invention to provide a microcontroller monitor which resets the microcontroller when the power supply drops below a predetermined minimum voltage. It is a further objective of the present invention to provide a microcontroller monitor which resets the microcontroller when the microcontroller gets stopped inadvertently as it proceeds through its operational loop.

SUMMARY OF THE INVENTION

The present invention is a circuit for monitoring the power supply and the output from a microcontroller in a furnace system. The circuit includes a voltage monitoring means for monitoring the voltage supplied to the microcontroller, a microcontroller monitoring means for monitoring the output of the microcontroller, and a switch adapted to cause the microcontroller to reset if either the voltage monitoring means or the microcontroller monitoring means indicates that a problem exists.

DESCRIPTION OF THE PREFERRED EMBODIMENT

Figure 1:
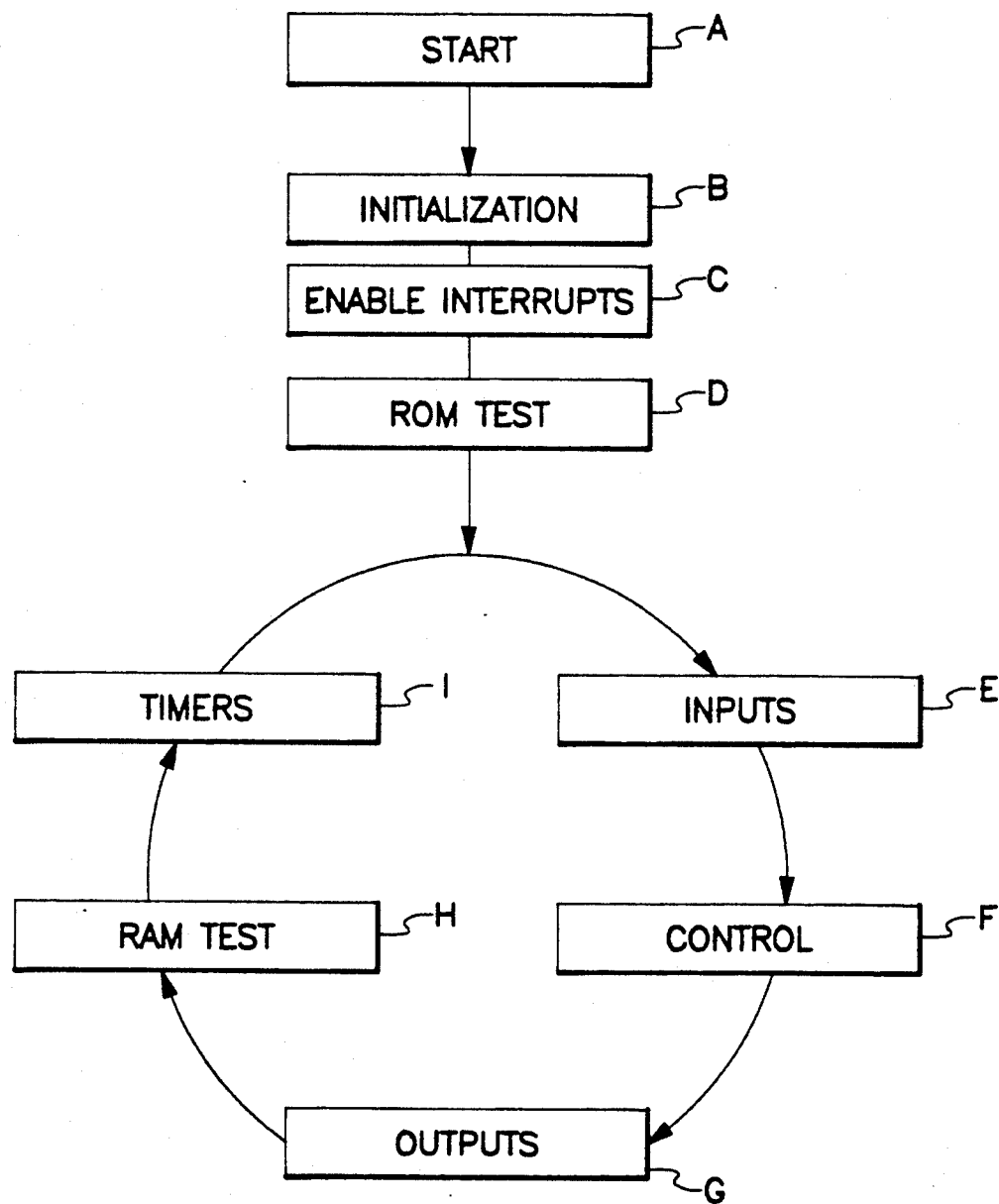
FIG. 1 is a flow diagram of the microcontroller of the prior art.
Figure 2:
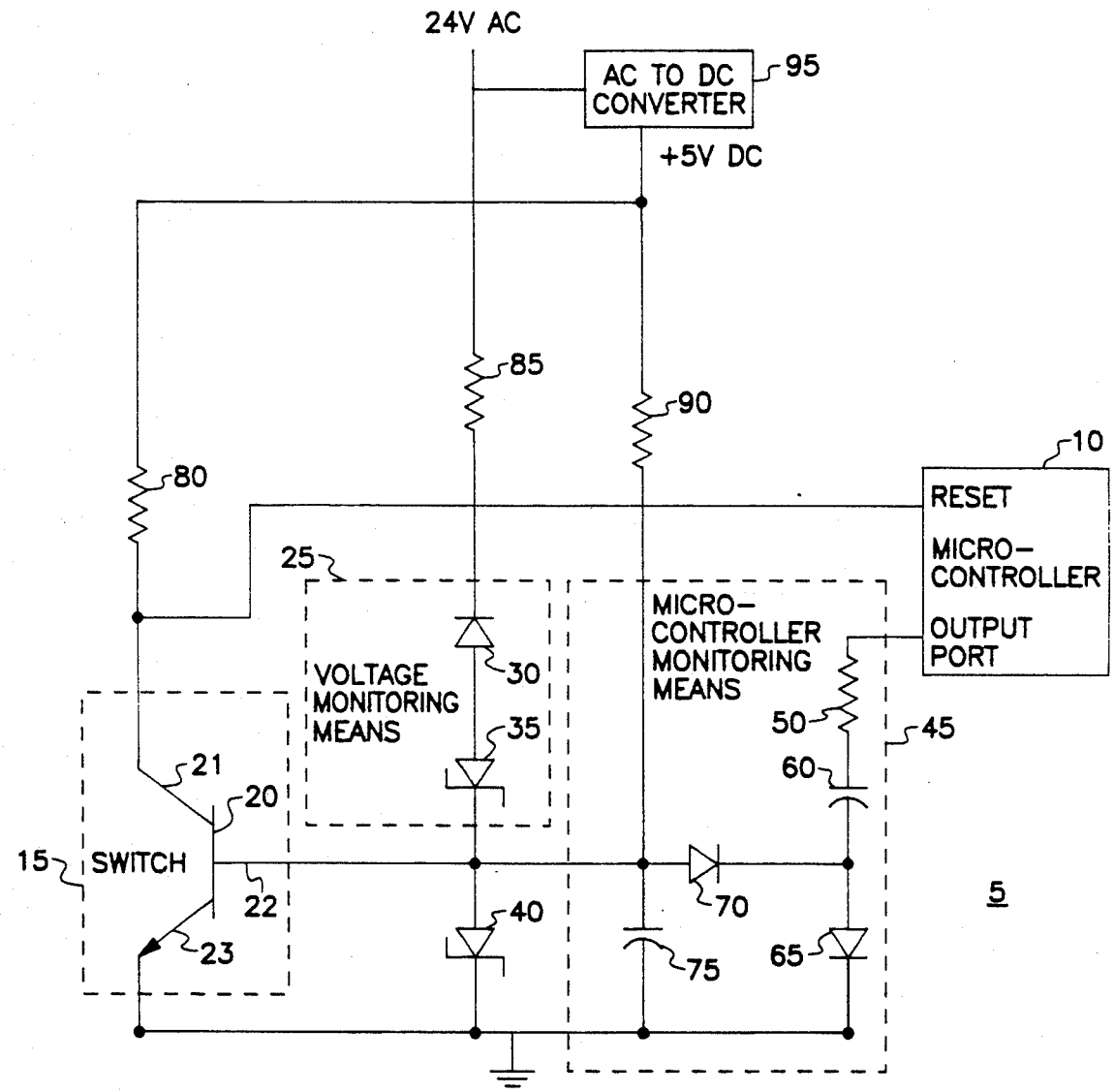
FIG. 2 is a block and schematic diagram of the present invention.

With reference to FIG. 2, thereshown is a furnace control system 5 which includes the present invention. Microcontroller 10 controls operation of a furnace (not shown) by following a preprogrammed set of instructions. The microcontroller includes two ports, an output port and a reset port. The output port puts out a signal which indicates that the microcontroller is operating properly. In the present case, this signal is a 1000 Hz square wave. The reset port is adapted to cause the microcontroller to restart if the voltage at the reset port drops below a predetermined level. Thus for normal operation of the microcontroller it is desirable to maintain a voltage at the reset port which is higher than the predetermined level. DC power is supplied to the microcontroller by an ac power supply, converted to dc in converter 95.

Switch 15 is used to insure that the voltage at the reset port is at a high level during normal operation of the power supply and normal operation of the microcontroller. Here, switch 15 is comprised of a bipolar junction transistor (BJT) 20. Note that other types of transistors, and other voltage controlled switches such as relays could be used as substitutes for BJT 20. BJT 20 has a collector 21, a base 22 and an emitter 23. The collector is tied to a direct current power supply for biasing, through resistor 80. The emitter 23 is tied to the return side of the direct current power supply, which is ground in the present embodiment. The base 22 is a control line for the switch. If the voltage at the base 22 is greater than a second predetermined voltage, BJT 20 turns on and the voltage at collector 21 is sunk to ground, thus causing the microcontroller 10 to reset. If the voltage at the base is kept below the second predetermined voltage, then BJT 20 is kept off and a high voltage remains on collector 21 and at the reset port.

Voltage monitoring means 25 is connected between the control line of switch 15 and the power source of the limit switches through resistor 85. The voltage monitoring means 25 is comprised of first diode 30 and first zener diode 35, each diode having a cathode and an anode. Here, the cathode of first diode 30 is connected to resistor 85, while its anode is connected to the anode of first zener diode 35. First zener diode 35 has a breakdown voltage in this embodiment of $V_{BK} = -24$ volts, which is equal to the negative peak of the AC voltage supply.

Microcontroller monitoring means 45 is connected between microcontroller 10 and the control line of switch 15. One embodiment of the microcontroller monitoring means includes a resistor 50, first capacitor 60 having a cathode and an anode, second diode 65 having a cathode and an anode, third diode 60 having a cathode and an anode, second capacitor 75 having a cathode and an anode and second zener diode 40 a cathode and an anode.

Resistor 50 has first and second ports, the first port being connected to the output port of the microcontroller 10. The anode of first capacitor 60 is connected to the second port of resistor 50.

The cathode of first capacitor 60 is connected to both the anode of first diode 65 and the cathode 70 of second diode 70. The cathode of first diode 65 is connected to ground. The anode of second diode 70 is connected to the control line of switch 15 (the base 22 of BJT 20).

The anode of capacitor 75 is also connected to the control line of switch 15, while its cathode is connected to ground.

The anode of second zener diode 40 is connected to the control line of switch 15, while its cathode is connected to ground.

A preferred embodiment of the present invention uses the following parts: BJT 20 is a 2N3417 transistor, resistor 80 is 10,000 ohm resistor, resistor 85 is a 2000 ohm resistor, resistor 90 is a 82,000 ohm resistor, first zener diode 35 has a $V_{BK} = -24$ volts, second zener diode has a $V_{BK} = -5.6$ volts, resistor 50 is a 2000 ohm resistor and first and second capacitors 60, 75 are .1 farad capacitors.

The operation of the circuit will now be described. As was stated earlier, to prevent microcontroller 10 from resetting, a high voltage must be maintained at the reset port. This in turn requires that a low voltage be maintained at the control line of switch 15, or in this case at the base 22 of BJT 20. There are two criteria, either of which will insure that the voltage on the control line stays low.

The first criteria is that the AC voltage source must go negative with respect to ground. This creates a path from ground through second capacitor 75, through first zener diode 35, through first diode 30, through resistor 85 back to the voltage source. If the voltage is large, first zener diode 35 will break down and current will flow. This will cause a negative voltage to appear across second capacitor 75, thus keeping BJT 20 in an off state and the microcontroller 10 operating normally. If the AC supply is too small, then first zener diode 35 will not break down and BJT 20 will be turned on, thus causing a low voltage at the reset line and resetting the microcontroller 5.

The second criteria is that during the positive half cycle of the AC power supply, the microcontroller 5 must have a 1000 Hz output signal at the output port to prevent the microcontroller 5 from resetting. Software internal to the microcontroller allows the 1000 Hz signal to occur only during the positive half cycle of the AC power supply. Of course, the exact frequency is a matter of design choice and can be changed by changing the resistance of resistor 50 and/or the capacitance of first capacitor 60. When the output port is high, first capacitor 60 charges through resistor 50 and second diode 65. When the output port goes low, there is a path to shuttle the charge from first capacitor 60 to second capacitor 75.

In order to take advantage of both features of the circuit, the microcontroller 5 must, in this embodiment, produce a 1000 Hz output signal during the positive half cycle of the AC power supply. This keeps second capacitor 75 negative, thus keeping the BJT 20 off and the voltage at the reset port high. On the negative half cycle of the AC power supply, the output port is set high and the AC power supply signal is responsible for keeping second capacitor 75 negative and the BJT 20 off. If the AC power supply signal drops, the second capacitor 75 will be charged positive by resistor 90 and cause the BJT 20 to be on, which in turn causes the microcontroller 5 to reset. If the microcontroller 5 quits sending out the 1000 Hz signal, second capacitor 75 will again charge positively and cause microcontroller 5 to reset.

It is important to note that resistor 90 and second capacitor 75 are selected to have a time constant which insures that a reset can occur in less than one-half of a 60 Hz cycle if either the 1000 Hz signal or the AC power supply signal are missing. Also, second zener diode 40 is used to insure that second capacitor 75 can never be charged too negatively to operate during the microcontroller monitoring part of the cycle.

The foregoing has been a description of the construction and operation of a novel integrated low voltage detect and watchdog circuit having few parts. The inventors do not intend to limit the invention to the foregoing description, but instead define the limits of the foregoing invention in the following claims.

We claim:

1. A monitoring circuit for a microcontroller, the microcontroller including an output port and a reset port, the microcontroller being adapted to reset when a first signal is present at the reset port, the monitoring circuit comprising:

a switch having a control line, said switch being adapted to provide a continuous second signal different from the first signal, to the reset port when a low voltage is present at said control line, and the first signal otherwise;

a voltage monitoring means having an output port electrically connected to said control line, said voltage monitoring means being adapted to measure a desired voltage and producing a low voltage at said output port of said voltage monitoring means when said desired voltage is within a predetermined range of values, and a high voltage otherwise; and microcontroller monitoring means having an input port connected to the output port of the microcontroller and an output port connected to said control line, said microcontroller monitoring means being adapted to produce a low voltage at said output port of said microcontroller monitoring means when the microcontroller produces an output signal within a predetermined frequency range, and a high voltage otherwise.

2. The monitoring circuit of claim 1, wherein said switch is a transistor.

3. The monitoring circuit of claim 2, wherein said voltage monitoring means comprises:

a first diode having an anode and a cathode, said cathode being adapted to be connected to a voltage source to be monitored; and a zener diode having a cathode and an anode, and being rated for breakdown at said desired voltage, said anode of said zener diode being connected to said anode of said first diode, and said cathode being connected to said control line.

4. The monitoring circuit of claim 3, wherein said microcontroller monitoring means comprises:

a resistor having first and second ports, said first port being connected to the output of the microcontroller;

a first capacitor having a cathode and an anode, said anode being connected to said second port of said resistor;

a second diode having a cathode and an anode, said anode being connected to said cathode of said first capacitor;

a third diode having a cathode and an anode, said cathode being connected to said anode of said first capacitor; and a second capacitor having a cathode and an anode, said anode being connected to said anode of said third diode and said control line, said cathode being connected to said cathode of said second diode and being adapted to be connected to a voltage return of the source of the desired voltage.

5. The monitoring circuit of claim 1, wherein said voltage monitoring means comprises:

a first diode having an anode and a cathode, said cathode being adapted to be connected to a voltage source to be monitored; and a zener diode having a cathode and an anode, and being rated for breakdown at said desired voltage, said anode of said zener diode being connected to said anode of said first diode, and said cathode being connected to said control line.

6. The monitoring circuit of claim 5, wherein said microcontroller monitoring means comprises:

a resistor having first and second ports, said first port being connected to the output of the microcontroller;

a first capacitor having a cathode and an anode, said anode being connected to said second port of said resistor;

a second diode having a cathode and an anode, said anode being connected to said cathode of said first capacitor;

a third diode having a cathode and an anode, said cathode being connected to said cathode of said first capacitor; and a second capacitor having a cathode and an anode, said anode being connected to said anode of said third diode and said control line, said cathode being connected to said cathode of said second diode and being adapted to be connected to a voltage return of the source of the desired voltage.

7. The monitoring circuit of claim 1, wherein said microcontroller monitoring means comprises:

a resistor having first and second ports, said first port being connected to the output of the microcontroller;

a first capacitor having a cathode and an anode, said anode being connected to said second port of said resistor;

a second diode having a cathode and an anode, said anode being connected to said cathode of said first capacitor;

a third diode having a cathode and an anode, said cathode being connected to said cathode of said first capacitor; and a second capacitor having a cathode and an anode, said anode being connected to said anode of said third diode and said control line, said cathode being connected to said cathode of said second diode and being adapted to be connected to a voltage return of the source of the desired voltage.

8. A furnace control, comprising:

a microcontroller, said microcontroller including an output port and reset port, said microcontroller being adapted to reset when a first level signal is present at said reset port;

a switch having a control line, said switch being adapted to provide a continuous second level signal to the reset port when a first voltage is present at said control line, and said first signal otherwise;

a voltage monitoring means having an output port electrically connected to said control line, said voltage monitoring means being adapted to measure a desired voltage in producing said first voltage in said output port of said voltage monitoring means when said desired voltage is within a predetermined range of voltages, and a second voltage output otherwise; and microcontroller monitoring means having an input port connected to the output port of the microcontroller and an output port connected to said control line, said microcontroller monitoring means being adapted to produce said first voltage at said output port of said microcontroller monitoring means when the microcontroller produces an output signal within a predetermined frequency range, and a second voltage otherwise.

9. The furnace control of claim 8, wherein said switch is a transistor.

10. The furnace control of claim 9, wherein said voltage monitoring means comprises:

a first diode having an anode and a cathode, said cathode being adapted to be connected to a voltage source to be monitored; and a zener diode having a cathode and an anode, and being rated for breakdown at said desired voltage, said anode of said zener diode being connected to said anode of said first diode, and said cathode being connected to said control line.

11. The furnace control of claim 10, wherein said microcontroller monitoring means comprises:

a resistor having first and second ports, said first port being connected to the output of the microcontroller;

a first capacitor having a cathode and an anode, said anode being connected to said second port of said resistor;

a second diode having a cathode and an anode, said anode being connected to said cathode of said first capacitor;

a third diode having a cathode and an anode, said cathode being connected to said cathode of said first capacitor; and a second capacitor having a cathode and an anode, said anode being connected to said anode of said third diode and said control line, said cathode being connected to said cathode of said second diode and being adapted to be connected to a voltage return of the source of the desired voltage.

12. The furnace control of claim 8, wherein said voltage monitoring means comprises:

a first diode having an anode and a cathode, said cathode being adapted to be connected to a voltage source to be monitored; and a zener diode having a cathode and an anode, and being rated for breakdown at said desired voltage, said anode of said zener diode being connected to said anode of said first diode, and said cathode being connected to said control line.

13. The furnace control of claim 12, wherein said microcontroller monitoring means comprises:

a resistor having first and second ports, said first port being connected to the output of the microcontroller;

a first capacitor having a cathode and an anode, said anode being connected to said second port of said resistor;

a second diode having a cathode and an anode, said anode being connected to said anode of said first capacitor;

a third diode having a cathode and an anode, said cathode being connected to said cathode of said first capacitor; and a second capacitor having a cathode and an anode, said anode being connected to said anode of said third diode and said control line, said cathode being connected to said cathode of said second diode and being adapted to be connected to a voltage return of the source of the desired voltage.

14. The furnace control of claim 8, wherein said microcontroller monitoring means comprising:

a resistor having first and second ports, said first port being connected to the output of the microcontroller;

a first capacitor having a cathode and an anode being connected to said second port of said resistor;

a second diode having a cathode and an anode, said anode being connected to said cathode of said first capacitor;

a third diode having a cathode and an anode, said cathode being connected to said cathode of said first capacitor; and a second capacitor having a cathode and an anode, said anode being connected to said anode of said third diode and said control line, said cathode being connected to said cathode of said second diode and being adapted to be connected to a voltage return of the source of the desired voltage.

* * * * *